United States Patent
Higuchi et al.

(10) Patent No.: US 6,684,728 B2
(45) Date of Patent: Feb. 3, 2004

(54) RECTILINEAR MOTION DRIVING APPARATUS

(75) Inventors: Yasuo Higuchi, Aichi (JP); Tatsurou Hirayama, Aichi (JP)

(73) Assignee: Pubot Giken Co., Ltd., Aichi (JP)

(*) Notice: Subject to any disclaimer, the term of this patent is extended or adjusted under 35 U.S.C. 154(b) by 80 days.

(21) Appl. No.: 09/926,141

(22) PCT Filed: Dec. 28, 2000

(86) PCT No.: PCT/JP00/09360

§ 371 (c)(1),
(2), (4) Date: Sep. 10, 2001

(87) PCT Pub. No.: WO02/36989

PCT Pub. Date: May 10, 2002

(65) Prior Publication Data

US 2002/0157490 A1 Oct. 31, 2002

(30) Foreign Application Priority Data

Oct. 27, 2000 (JP) .......................................... 2000-369291

(51) Int. Cl.⁷ .............................................. F16H 25/20
(52) U.S. Cl. ........................................ 74/424.91; 74/89
(58) Field of Search ........................ 74/424.89, 424.91, 74/424.92, 89.37, 89.33

(56) References Cited

U.S. PATENT DOCUMENTS 4,295,384 A * 10/1981 Brandt et al. .............. 74/89.37

FOREIGN PATENT DOCUMENTS

| GB | 2 111 635 | 7/1983 |
|----|-----------|--------|
| JP | 6-16756 | 3/1994 |
| JP | 8-219248 | 8/1996 |
| JP | 11-159593 | 6/1999 |
| JP | 2000-314461 | 11/2000 |

OTHER PUBLICATIONS

Copy of International Search Report.

* cited by examiner

Primary Examiner—William C. Joyce
(74) Attorney, Agent, or Firm—Armstrong, Kratz, Quintos, Hanson & Brooks, LLP

(57) ABSTRACT

In a rectilinear motion driving apparatus, a shaft is fitted into a cylindrical body in a coaxial state, and a plurality of cylindrical coil rollers are interposed between the cylindrical body and the shaft by press fit so as to roll at a predetermined inclined angle to the axial direction. These cylindrical coil rollers are contacted with an outer peripheral surface of the shaft and an inner peripheral surface of the cylindrical body with a pressure contact force, and the cylindrical body or the shaft is rotated so that the shaft or the cylindrical body makes a rectilinear motion toward an axial direction. A pressure contact force of both inner and outer surfaces of the cylindrical coil roller to the cylindrical body and the shaft is set either higher or lower in the vicinity of the end portion thereof than the intermediate portion of the cylindrical body.

4 Claims, 5 Drawing Sheets

RECTILINEAR MOTION DRIVING APPARATUS

BACKGROUND OF THE INVENTION

1. Field of the Invention

The present invention relates to a rectilinear motion driving apparatus, which is applicable to facilities in a factory, various industrial machines or the like, and is driven by rotation of an electric motor, and converts a rotational motion into a rectilinear motion so that an output part can be linearly moved.

2. Description of the Related Art

Conventionally, in various technical fields, a ball screw has been used as a driving mechanism, which is driven by a rotation of electric motor so that an output part can be made rectilinear motion. This type of ball screw is constructed in a manner such that a female screw block is screwed onto an outer periphery of a screw shaft via many bearings, and the screw shaft is driven by a rotation of an electric motor so that the female screw block is linearly moved along an axial direction. However, in the ball screw, high accuracy is required for machining the screw shaft and the female screw block. For this reason, a problem arises such that a manufacture cost is high, and the price becomes high.

In order to solve the above problem, the inventor of the present invention has proposed a rectilinear motion driving apparatus disclosed in Japanese Unexamined Patent Publication (Kokai) No. 8-219248. The rectilinear motion driving apparatus is constructed in a manner such that a cylindrical coil spring is assembled between a cylinder having a slit formed in its axial direction and shaft at a predetermined angle to the axial direction, and an outer periphery of the cylinder is clamped by a ring to mount it.

However, this rectilinear motion driving apparatus has the following problem. More specifically, in the case where an inner surface of the cylinder has a low circularity (deviation from circular form) and is not formed into a true circle with high accuracy, a pressure contact force to the cylinder and the shaft varies in accordance with a rotational position of the cylindrical coil spring. As a result, it is difficult to obtain a stable rectilinear motion.

Moreover, a power transmission is made by a frictional force of the cylindrical coil spring from the cylinder to the shaft or from the shaft to the cylinder. However, in this case, their metallic curved surfaces contact each other. For this reason, a slip is generated between the cylindrical coil spring and the cylinder or shaft in driving. The slip is generated in an axial direction, and then, when the axial slip is repeated, a position of the cylindrical coil spring is biased in one direction by the above accumulative slip. As a result, a problem arises such that a motion stroke of the shaft gradually reduces.

Accordingly, an object of the present invention is to provide a rectilinear motion driving apparatus, which can be manufactured at a low cost as compared with a ball screw, and can carry out a stable rectilinear motion. Further, another object of the present invention is to provide a rectilinear motion driving apparatus, which can prevent a positioned bias of a cylindrical coil roller by an slip.

SUMMARY OF THE INVENTION

In order to achieve the above object, the present invention provides a rectilinear motion driving apparatus. In the rectilinear motion driving apparatus, a shaft is fitted into a cylindrical body in a coaxial state, and a plurality of cylindrical coil rollers is interposed between the cylindrical body and the shaft by press fit so as to roll at a predetermined inclined angle to the axial direction. Further, these cylindrical coil rollers contact with an outer peripheral surface of the shaft and an inner peripheral surface of the cylindrical body with a pressure contact force, and the cylindrical body or the shaft is rotated so that the shaft or the cylindrical body makes a rectilinear motion toward an axial direction. The cylindrical coil roller is arranged so as to roll on the outer peripheral portion of the shaft, and is arranged at an inclined angle to the axial direction of the shaft and the cylindrical body. Therefore, a pressure contact force to both surfaces of the cylindrical coil roller held between the inner peripheral surface of the cylindrical body and the outer peripheral surface of the shaft is set higher in the vicinity of the end portion of the cylindrical body or the shaft, or is set lower in the vicinity of the end portion of the cylindrical body or the shaft. By doing so, it is possible to correct a positional bias of the cylindrical coil roller by the accumulative slip.

In this case, in order to increase the pressure contact force to both surfaces of the cylindrical coil roller held between the inner peripheral surface of the cylindrical body and the outer peripheral surface of the shaft in the vicinity of the end portion of the cylindrical body or the shaft, the end portion of the cylindrical body may be formed thicker than the intermediate portion thereof. Further, in order to reduce the pressure contact force to both surfaces of the cylindrical coil roller held between the inner peripheral surface of the cylindrical body and the outer peripheral surface of the shaft in the vicinity of the end portion of the cylindrical body or the shaft, the end portion of the shaft may be provided with a taper portion formed in a manner such that the outer diameter of the end portion of the shaft is gradually reduced. Furthermore, the cylindrical body is formed of a pipe having a relatively thin wall thickness, and then, both ends of the pipe may be bound so that no deformation is generated in a radius direction.

DETAILED DESCRIPTION OF THE PREFERRED EMBODIMENT

Figure 1:
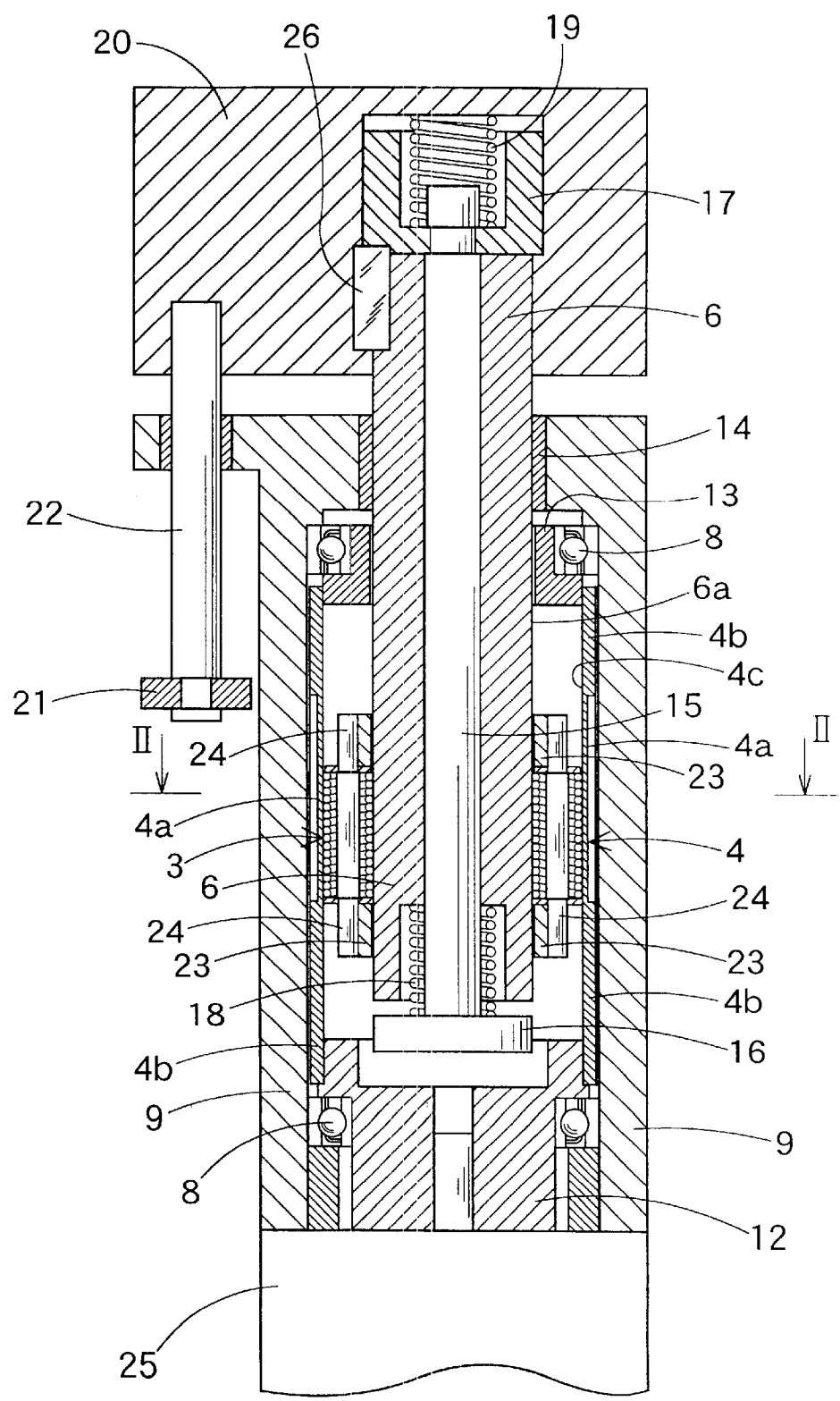
FIG. 1 is an axial sectional view showing a rectilinear motion driving apparatus according to one embodiment of the present invention.

As shown in FIG. 1, a cylindrical body 4, which is a rotary driving part of the rectilinear motion driving apparatus, is supported in such a manner that one end is fixed to a rotating member 12, and the other end is fixed to a rotating support member 13, and is rotatably mounted in a cylindrical housing 9. An intermediate portion of the cylindrical body 4 is formed thinner as a thin-wall portion 4a, and the upper and lower portions thereof are formed thicker as a thick-wall portion 4b.

An electric motor 25 is fixed to a lower end of the housing 9, and a rotary shaft of the electric motor 25 is connected to a rotating member 12. The rotating member 12 is supported so as to be rotatable in the housing 9 via an angular bearing 8, and is bound so as not to be movable to an axial direction. Likewise, the rotary support member 13 is supported so as to be rotatable in the housing 9 via the angular bearing 8, and is bound so as not to be movable to an axial direction.

A shaft 6 is coaxially inserted into the housing 9, and is supported by a guide metal 14 concentric with the cylindrical body 4 provided on the upper portion of the housing 9 so as to be slidable in an axial direction. Further, the shaft 6 is formed with a center hole in the axial direction, and a center shaft 15 is inserted into the center hole. Upper and lower ends of the center shaft 15 are projected toward the outside of the shaft 6 in such a manner that a stopper 16 is fixed to the lower end thereof, and a stopper 17 is fixed to the upper end thereof. A coil spring 18 is mounted between the stopper 16 and the lower end of the shaft 6, and a coil spring 19 is mounted between the stopper 17 and an output block 20.

The output block 20 is fixed by fitting a rotation blocking key 26 into the upper end of the shaft 6; therefore, the center shaft 15 is movable in the shaft 6 by a slight distance to the axial direction. Further, a rotation blocking rod 22 is fixed to the output block 20 toward the housing 9 side. The rotation blocking rod 22 is inserted into a fitting hole of a slid retainer provided on the upper end of the housing 9, and a stopper 21 is fixed to the distal end of the rotation blocking rod 22.

Figure 2:
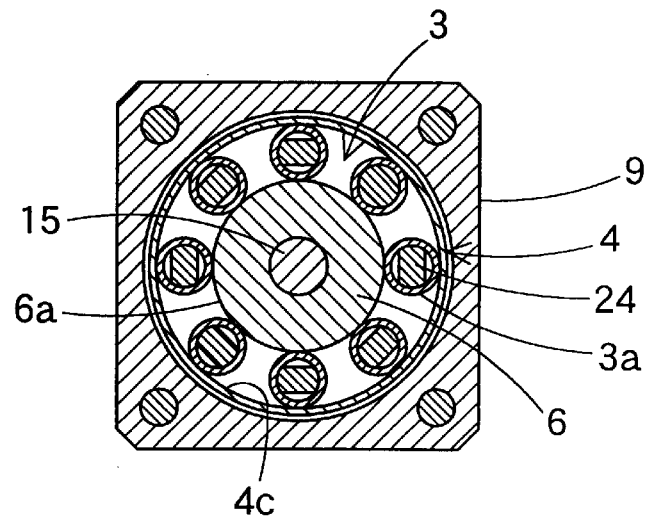
FIG. 2 is a sectional view cut along a line II—II line of FIG. 1.
Figure 3:
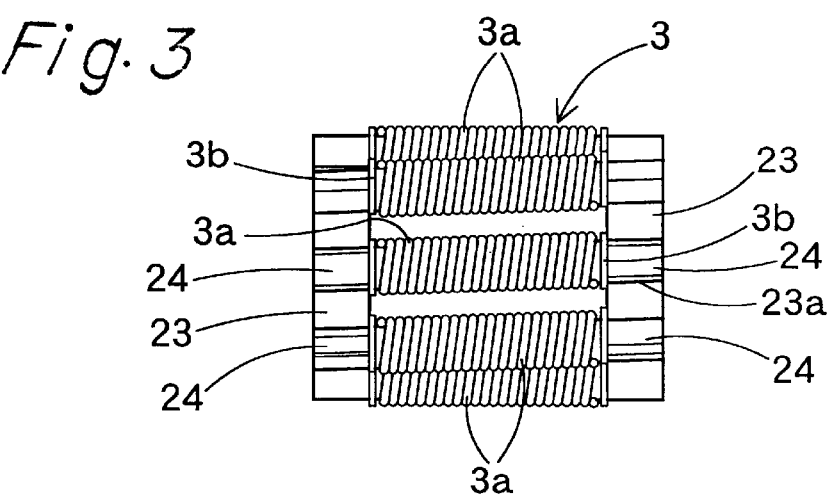
FIG. 3 is a side view showing a cylindrical coil roller assembly.
Figure 4:
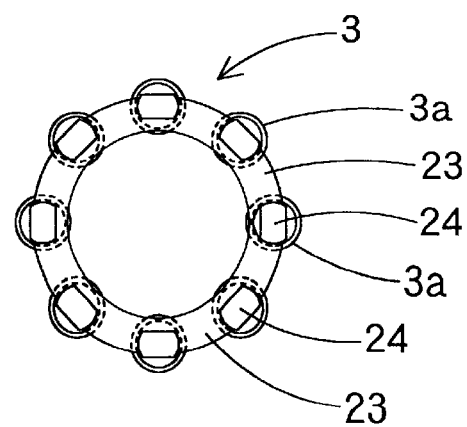
FIG. 4 is a front view showing the cylindrical coil roller assembly.

A cylindrical coil roller assembly 3 is interposed between the cylindrical body 4 and the shaft 6. The cylindrical coil roller assembly 3 is constructed in the following manner. More specifically, as shown in FIG. 2 to FIG. 4, two short cylindrical retainer rings 23 are formed with eight (8) inclined grooves 23a, which are inclined by a predetermined angle (e.g., one degree) to the axial direction at angular intervals of 45, at their outer periphery. Further, a cylindrical coil roller 3a is fitted outside a retainer pin 24, and then, both ends of the retainer pin 24 are fitted into the inclined groove 23a. Each of eight cylindrical coil rollers 3a is formed of a cylindrical coil spring.

Both ends of the retainer pin 24 are chamfered like flat toward the axial direction, and the retainer pin 24 is formed into a shape of deformed cross section. Further, both ends of the retainer pin 24 are fitted into the inclined groove 23a so that a rotation is blocked. The cylindrical coil roller 3a is loosely fitted to the outer peripheral portion of the retainer pin 24 with a slight gap. A spring washer 3b is fitted to a predetermined position from both sides of the retainer pin 24; therefore, the cylindrical coil roller 3a is mounted to the outer peripheral portion of the retainer pin 24 in a state of being held between the spring washers 3b provided on its both side.

As shown in FIG. 2, the retainer pin 24 is provided with a flat chamfered portion at the outer and inner peripheral portions of the cylindrical coil roller 3a, and thereby, a slight gap is formed between the inner side of each cylindrical coil roller 3a and the retainer pin 24. Thus, each cylindrical coil roller 3a is slightly bent by the outer peripheral portion of the shaft 6, and is rotatable around the retainer pin 24.

The cylindrical coil roller assembly 3 constructed as described above is held between the shaft 6 and the cylindrical body 4 by a press fit. By doing so, each cylindrical coil roller 3a of the cylindrical coil roller assembly 3 contacts with an inner peripheral surface 4c of the cylindrical body 4 and an outer peripheral surface 6a of the shaft 6 with a pressure contact force, and is arranged so as to roll. The pressure contact force is generated by an elastic deformation of each cylindrical coil roller 3a and the cylindrical body 4. An inclined angle of each cylindrical coil roller 3a of the cylindrical coil roller assembly 3 to the shaft 6 or the axis of the cylindrical body 4 is set to about one degree, for example.

Subsequently, the following is a description on an operation of the rectilinear motion driving apparatus having the above construction. When the electric motor 25 starts up, the rotating member 12 connected to the output shaft of the motor rotates, and thereby, the cylindrical body 4, which is vertically bound in the axial direction by the rotating member 12 and the rotating support member 13, is rotated in the housing 9. In this case, the rotation of the shaft 6 is blocked. Therefore, each cylindrical coil roller 3a rolls while moving in the axial direction between the inner peripheral surface 4c of the cylindrical body 4 and the outer peripheral surface 6a of the shaft 6. As a result, by the rotation and rolling of the cylindrical coil roller 3a, the shaft 6 is moved in the axial direction at a speed twice as much as the cylindrical coil roller assembly 3.

In this case, a thrust of the shaft 6 is transmitted to the output block 20 via a compressive force of the coil spring 18 or the coil spring 19, and then, the output block 20 does the work of rectilinear motion to the outside.

In the case where the output block 20 is moved to a projecting or retracting direction, and stopped by an external force, the shaft 6 slightly moves in the axial direction until it is fully stopped by the stopper 16 or 17 wile compressing the coil spring 18 or the coil spring 19. When the shaft 6 is stopped, a rotational resistance of the cylindrical body 4 rapidly increases. Therefore, the rotation of the electric motor 25 is stopped. In this state, even if the power of the electric motor 25 is turned off, the thrust of the shaft 6 is maintained. More specifically, the inclined angle to the axial direction of each cylindrical coil roller 3a of the cylindrical coil roller assembly 3 is set to a micro value (e.g., one degree). Therefore, even in the case where a thrust is applied to the shaft 6 from the outside in a stopped state, the cylindrical body 4 is not rotated, and an reverse operation is prevented. As a result, the thrust of the shaft 6 can be maintained.

Next, from the above stopped state, the electric motor 25 is rotated in reverse, and then, when the cylindrical body 4 is rotated to a direction reverse to above so that the shaft 6 is moved in a reverse direction. By doing so, a compression spring force of the coil spring 18 or the coil spring 19 acts in a direction facilitating a rotation, and thereby, the electric motor 25 can begin to move by a rotational force smaller than the stopped rotational force.

As described above, the electric motor 25 is rotated in a normal/reverse direction so that the cylindrical body 4 is rotated in a normal/reverse direction, and the shaft 6 is driven in a projecting or retracting direction. In this type of rectilinear motion driving apparatus, the rotational motion is converted into a rectilinear motion by a frictional transmission between the cylindrical coil roller 3a and the inner peripheral surface 4c of the cylindrical body 4 and the outer peripheral surface 6a of the shaft 6. For this reason, when the motor stops or starts up, a slip is easy to be generated in a frictional transmission surface although it is slight. The slip is generated in the axial direction of the shaft 6. When the axial slip is accumulated by a reparative operation of normal/reverse rotation, the stop position of the cylindrical coil roller assembly 3 is biased in one direction. As a result, a movement the stroke of shaft gradually reduces.

However, in the rectilinear motion driving apparatus of the present invention, a pressure contact force of frictional transmission surface is varied in the axial direction in the following manner. By doing so, it is possible to reduce the accumulative slip between the cylindrical coil roller assembly 3 and the inner peripheral surface 4c of the cylindrical body 4 and between the same and the outer peripheral surface 6a of the shaft 6 to an allowable range.

More specifically, when the pressure contact surface of the cylindrical coil roller assembly 3 slips an axial slip of the cylindrical coil roller assembly 3 is generated in a direction in which a pressure contact force reduces. So, in the rectilinear motion driving apparatus of the present invention, as shown in FIG. 1, a wall thickness of the cylindrical body 4 is increased in the vicinity of both ends thereof. Namely, the cylindrical body 4 is formed with a thick wall portion 4b at the upper and lower portions (both end portions) thereof. By doing so, when the cylindrical coil roller assembly 3 approaches their both ends of the cylindrical body 4, a pressure contact force is increased so that the slip can be prevented from being accumulated. Therefore, in the case where a stop position of the cylindrical coil roller assembly 3 is too biased toward one end side, the cylindrical coil roller assembly 3 slips in a reverse direction, and thereby, an axial stop position of the cylindrical coil roller assembly 3 can be maintained within an allowable range.

Incidentally, in the case where the accumulative slip is slight and correction on the stop position is small, even if the cylindrical body 4 is formed thin as a whole without forming the thick wall portion, it is possible to reduce the bias of stop position within an allowable range. In this case, the intermediate portion of the cylindrical body 4 is formed thin. Therefore, it is easy to be flexible. On the contrary, both end portions of the cylindrical body 4 is fixed by the rotating member 12 and the rotating support member 13, and thereby, the cylindrical body 4 is firmly bound by these members. Therefore, it is possible to further increase a pressure contact force at the end portion between the cylindrical coil roller assembly 3 and the inner peripheral surface 4c of the cylindrical body 4 and between the same and the outer peripheral surface 6a of the shaft 6. Further, it is possible to prevent a slip from being accumulated so as to reduce the bias of stop position to an allowable range.

Moreover, the inclined angle of each cylindrical coil roller 3a of the cylindrical coil roller assembly 3 to the shaft 6 or to the axial direction of the cylindrical body 4 may be arbitrarily set. The smaller the inclined angle is set, the more a feed rate (speed) of the shaft 6 is reduced. The larger the inclined angle is set, the more the feed rate of the shaft 6 is increased. Therefore, the inclined angle of the cylindrical coil roller 3a is varied, and thereby, it is possible to arbitrarily change a reduction ratio. As a result, no reduction gear for the motor is required.

Next, the following is a description on an embodiment carried out in order to clarify the effect of the present invention. In this embodiment, each component was manufactured based on the following materials and dimensions, and a rectilinear motion driving apparatus having the above construction was manufactured experimentally, and thereafter, a test operation of the apparatus thus manufactured was made.

Materials and Dimensions

Shaft 6 . . . outer diameter 3.0 mm, an outer peripheral surface of rod-like steel was subjected to induction hardening, and thereafter, was subjected to hard chromium plating.

Cylindrical body 4 . . . a surface of cold drawing stainless steel pipe (tube) having an inner diameter of 50 mm was subjected to horning and nitriding, and the thin wall portion 4a has a wall thickness of 0.8 mm, and further, the thick wall portion 4b has a thickness of 1.5 mm.

Cylindrical coil roller 3a . . . a piano wire having a diameter of 2.0 mm (outer diameter center-less finishing) was used, and has a pitch of 2.1 mm, a coil outer diameter of 10.2 mm, a coil inner diameter of 6.2 mm, a free length of 39 mm, an inclined angle of one degree to the axial direction of the cylindrical coil roller 3a.

Electric motor . . . a motor having a DC of 24V and 5A was used, and has a rotational speed of 3000 RPM and a rated torque of 25 N cm.

The rectilinear motion driving apparatus having the above construction was manufactured experimentally, and thereafter, a test operation was made. As a result, it was confirmed that the rectilinear motion driving apparatus can output a thrust of 500N, and after the power of the electric motor was turned off, the thrust of the shaft has been kept. Further, it is possible to reduce the bias of a stop position by accumulative slip at the projecting and retracting ends of the shaft 6 to an allowable range.

Figure 5:
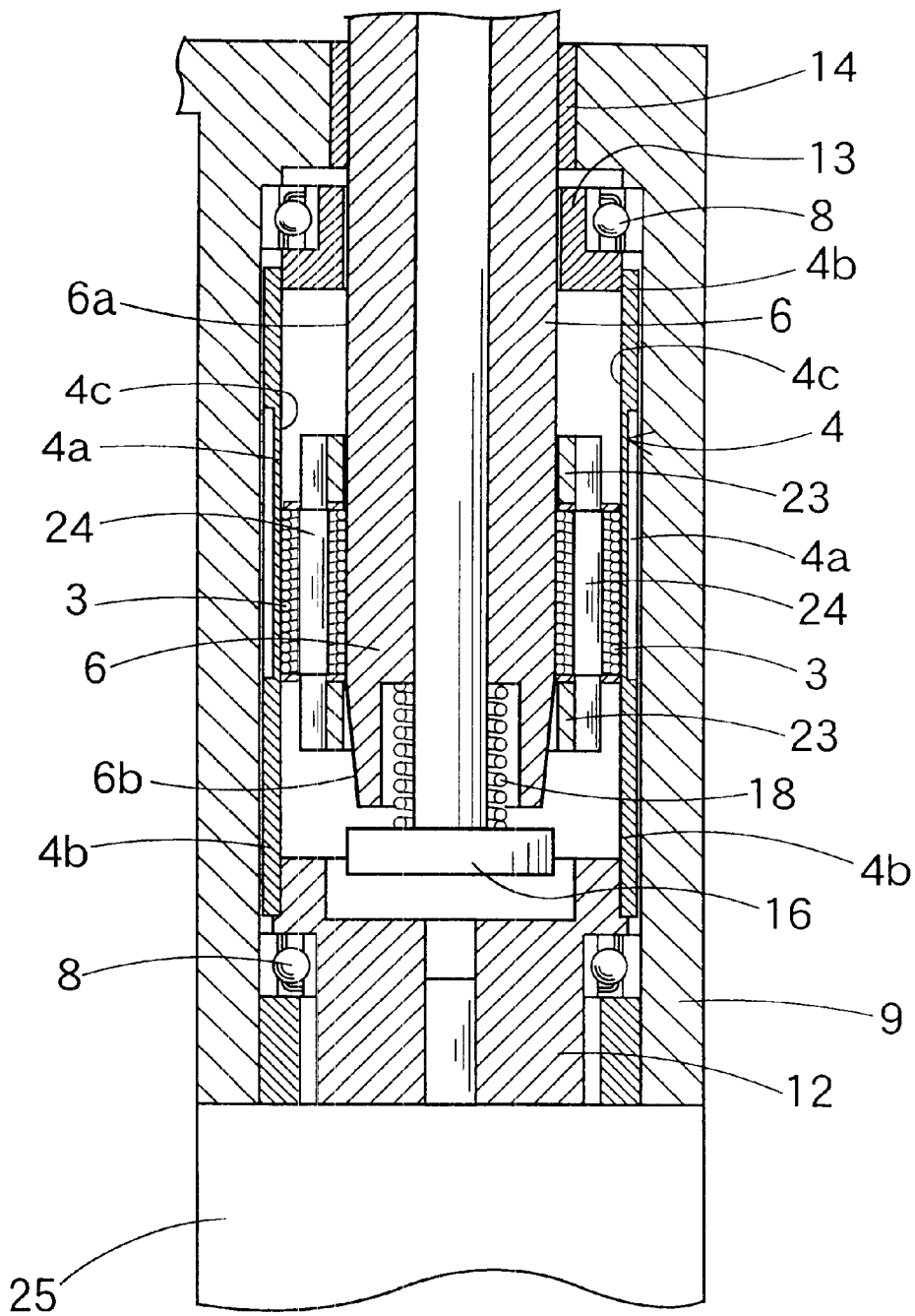
FIG. 5 is a partially sectional view showing a rectilinear motion driving apparatus according to another embodiment of the present invention.

FIG. 5 shows a rectilinear motion driving apparatus according to another embodiment. In this embodiment, the lower end of the shaft 6 is provided with a taper portion 6b, which is formed in a manner in which an outer diameter of the shaft 6 gradually decreases. Other parts are the same as the above embodiment, and the same reference numerals as the above embodiment are used to designate the same parts, and further, the details are omitted.

Mores specifically, as shown in FIG. 5, the taper portion 6b is formed at the stopper 16 side on the lower end of the shaft 6 so that an outer peripheral shape, that is, an outer diameter of the shaft 6 gradually decreases toward the lower end side. By doing so, when the cylindrical coil roller assembly 3 rotates and the shaft 6 moves toward the projecting direction, the stopper 16 approaches the cylindrical coil roller assembly 3. As a result, it is possible to reduce a pressure contact force between the cylindrical coil roller assembly 3 and the inner peripheral surface 4c of the cylindrical body 4 and between the same and the outer peripheral surface 6a of the shaft 6.

Therefore, the cylindrical coil roller assembly 3 slips toward the stopper 16, and then, is slipping until the retainer ring 23 reaches the stopper 16. Thus, as shown in FIG. 5, in the case of a structure in which the shaft 6 is stopped on a predetermined position by the internal stopper 16 at the projecting end of the shaft 6, it is possible to correct the bias of stop position of the cylindrical coil roller assembly 3 to the predetermined position.

Figure 6:
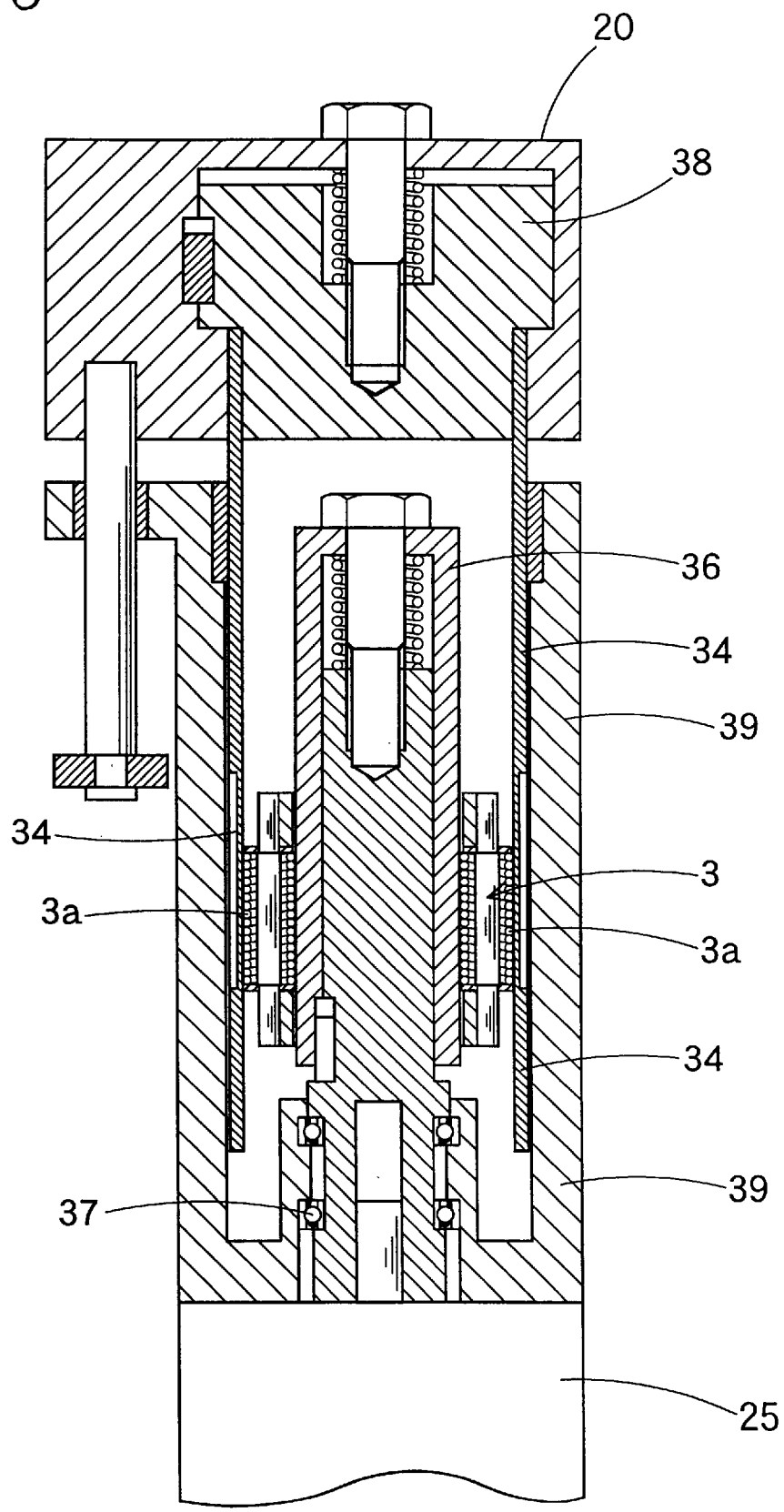
FIG. 6 is an axial sectional view showing a rectilinear motion driving apparatus according to still another embodiment of the present invention.

FIG. 6 shows a rectilinear motion driving apparatus according to still another embodiment. In this embodiment, the rectilinear motion driving apparatus is constructed in a manner that the relation between an input shaft and an output shaft is reverse to the above embodiment. Namely, a shaft 36 is driven by the rotation of the electric motor 25 so as to drive a cylindrical body 34 to an axial direction.

More specifically, in a housing 39, the cylindrical body 34 is supported so as to be movable to the axial direction in a state that a rotation of the cylindrical body 34 is blocked. Further, a rotary shaft of the electric motor 25 is connected to an end portion of the shaft 36 rotatably supported by a bearing 37 inside the cylindrical body 34. The cylindrical coil roller assembly 3 having the same construction as above is interposed between the cylindrical body 34 and the shaft 36 by press fit. The cylindrical coil roller assembly 3 is fitted so as to be held between an inner peripheral surface of the cylindrical body 34 and an outer peripheral surface of the shaft 36. Further, the cylindrical coil roller assembly 3 is arranged so as to roll in a manner such that inner and outer peripheral surfaces of the cylindrical coil roller 3*a* are abutted against the inner peripheral surface of the cylindrical body 34 and the outer peripheral surface of the shaft 36, respectively. The output block 20 upwardly projects from the housing 39, and is fixed to the upper portion of the cylindrical body 34 via a stopper 38 provided at the distal end of thereof. An intermediate portion of the cylindrical body 34 is formed thin as a thin wall portion, and the upper and lower portions thereof are formed thick as a thick wall portion.

When the electric motor 25 starts up, the shaft 36 connected to the rotary shaft of the motor is rotated, and then, the rotation is transmitted to each cylindrical coil roller 3*a* around the shaft 36, and thus, each cylindrical coil roller 3*a* rotates and rolls. Each cylindrical coil roller 3*a* is arranged in a state of being inclined to the axial direction of the shaft 36, and contacts with the inner peripheral surface of the cylindrical body 34 with a pressure contact force. Therefore, the cylindrical body 34 is prevented from being rotated, and is supported so as to be movable to the axial direction, and thereby, is moved to the axial direction. On the other hand, the output block 20 is linearly driven to a projecting or retracting direction in accordance with a rotating direction of the shaft 36. In this case, the upper and lower (both end) portions of the cylindrical body 4 are formed with a thick wall portion. Therefore, when the cylindrical coil roller assembly 3 approaches, a pressure contact force is increased, and it is possible to prevent a slip from being accumulated. In other words, in the case where the stop position of the cylindrical coil roller assembly 3 is too biased to one end side, it slips to a reverse direction, and thereby, the axial stop position of the cylindrical coil roller assembly 3 can be kept within an allowable range.

Figure 7:
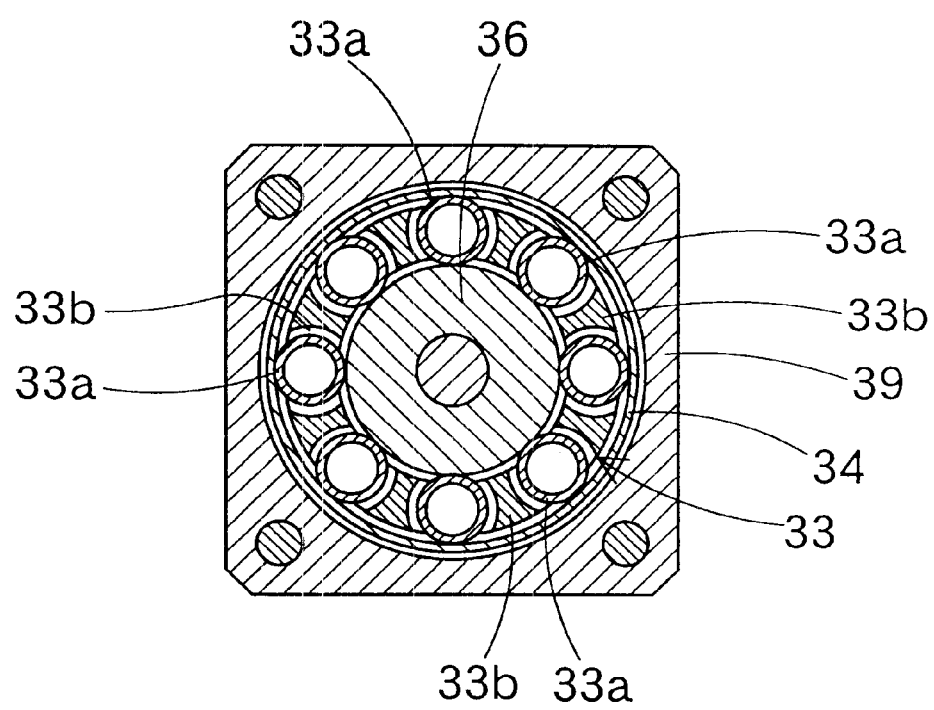
FIG. 7 is a sectional view showing a cylindrical coil roller assembly according to another embodiment of the present invention.

FIG. 7 shows another embodiment (modified example) of the cylindrical coil roller assembly. Each cylindrical coil roller 33*a* of the cylindrical coil roller assembly 33 is arranged so as to be rotatably supported from the outer peripheral portion, in place of the support by the retainer pin.

More specifically, the cylindrical coil roller assembly 33 is formed with a retainer 33*b* so that eight (8) cylindrical coil rollers 33*a* are rotatably supported at a predetermined interval on the circumference and at its outer peripheral portion of the retainer 33*b*. The cylindrical retainer 33*b* is formed with eight (8) recess portions for rotatably supporting these eight (8) cylindrical coil rollers 33*a* at an angular interval of approximately 45. Further, the recess portion is formed at an inclined angle of one degree to the axial direction. As described above, the cylindrical coil roller may be rotatably supported by the retainer 33*b* from the outer peripheral portion.

As is evident from the above description, in the rectilinear motion driving apparatus of the present invention, it is possible to obtain a stable rectilinear motion using the rotation of the motor as a driving source. Further, there is no need to machine a screw shaft and a female screw block with a high accuracy such as that required the ball screw, and the cylindrical coil roller assembly is constructed in a manner such that a plurality of cylindrical coil rollers is arranged at a predetermined inclined angle to the axial direction. The cylindrical coil roller assembly thus constructed is inserted between the cylindrical body and the shaft with a pressure contact force. Therefore, it is possible to inexpressively manufacture the rectilinear motion driving apparatus with a simple structure.

In addition, in a state in which the motor is stopped, even if a thrust is applied to the shaft from the outside, the cylindrical body is not rotated, and thereby, a reverse operation is prevented. Therefore, it is possible to maintain a thrust of shaft in a stopped state. Further, a pressure contact force of both inner and outer surfaces of the cylindrical coil roller is increased or decreased more than the intermediate portion in the cylindrical body and the end portion of the shaft. Thereby, it is possible to prevent a slip from being accumulated, and to reduce the bias of stop position to the least.

What is claimed is:

1. A rectilinear motion driving apparatus, comprising:
   a housing;
   a cylindrical body rotatably supported in the housing;
   an electric motor mounted to the housing and driving the cylindrical body by its rotation;
   a shaft coaxially supported in the cylindrical body so as to be movable in an axial direction in a state in which its rotation is blocked; and
   a plurality of cylindrical coil rollers interposed between the cylindrical body and the shaft by press fit so as to roll at a predetermined inclined angle to the axial direction, and contacting with an outer peripheral surface of the shaft and an inner peripheral surface of the cylindrical body with a pressure contact force,
   and rotating the cylindrical body so that the shaft makes a rectilinear motion in the axial direction,
   wherein a pressure contact force of the cylindrical coil roller to the cylindrical body and the shaft is set higher in the vicinity of the end portion of the cylindrical body than in an intermediate portion of the cylindrical body, and
   wherein a wall thickness of the end portion of the cylindrical body is formed thicker than the intermediate portion thereof, and thereby, a pressure contact force of the cylindrical coil roller to the cylindrical body and the shaft is set higher in the vicinity of the end portion of the cylindrical body than in an intermediate portion of the cylindrical body.

2. A rectilinear motion driving apparatus, comprising:
   a housing;
   a cylindrical body supported in the housing so as to be movable to an axial direction in a state in which its rotation is blocked;
   a shaft supported coaxially in the cylindrical body so as to be rotatable;
   an electric motor mounted to the housing and driving the shaft by its rotation; and
   a plurality of cylindrical coil rollers arranged between the cylindrical body and the shaft so as to roll at a predetermined inclined angle to the axial direction, and contacting with an outer peripheral surface and an inner peripheral surface of the cylindrical body with a pressure contact force,
   and rotating the shaft so that the cylindrical body makes a rectilinear motion in the axial direction, wherein a pressure contact force of the cylindrical coil roller to the cylindrical body and the shaft is set higher in the vicinity of the end portion of the cylindrical body than in an intermediate portion of the cylindrical body, and wherein a wall thickness of the end portion of the cylindrical body is formed thicker than the intermediate portion thereof and thereby, a pressure contact force of the cylindrical coil roller to the cylindrical body and the shaft is set higher in the vicinity of the end portion of the cylindrical body than in an intermediate portion of the cylindrical body.

3. The rectilinear motion driving apparatus according to claim 1 or 2, wherein the cylindrical body is formed of a pipe having a thin wall thickness, and in order to prevent a radius deformation of the end portion of the cylindrical body, the end portion of the cylindrical body is fixed to a rotating member so as to be bound.

4. A rectilinear motion driving apparatus, comprising:

a housing;

a cylindrical body rotatably supported in the housing;

an electric motor mounted to the housing and driving the cylindrical body by its rotation;

a shaft coaxially supported in the cylindrical body so as to be movable in an axial direction in a state in which its rotation is blocked; and a cylindrical coil roller interposed between the cylindrical body and the shaft by press fit so as to roll at a predetermined inclined angle in the axial direction, and contacting with an outer peripheral surface of the shaft and an inner peripheral surface of the cylindrical body with a pressure contact force, and rotating the cylindrical body so that the shaft makes a rectilinear motion, wherein a pressure contact force of the cylindrical coil roller to the cylindrical body and the shaft is set lower in the vicinity of the end portion of the shaft, and wherein the end portion of the shaft is formed with a taper portion whose outer diameter is gradually reduced, and thereby, a pressure contact force of the cylindrical coil roller to the cylindrical body and the shaft is set lower in the vicinity of the end portion of the shaft than in an intermediate portion of the cylindrical body.

* * * * *